July 10, 1923.
F. A. BARTLETT
CUTTING BUR
Filed Nov. 29, 1921
1,461,376
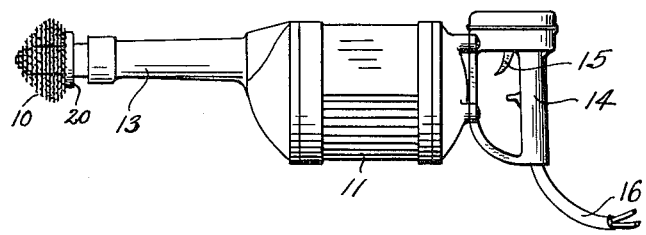
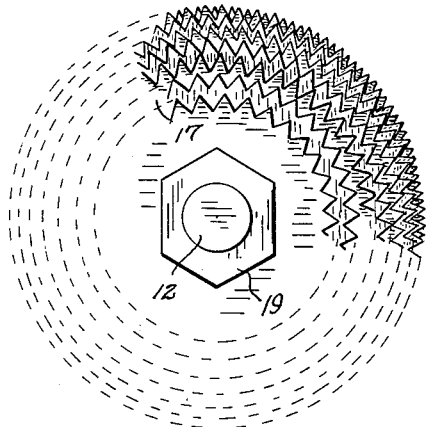
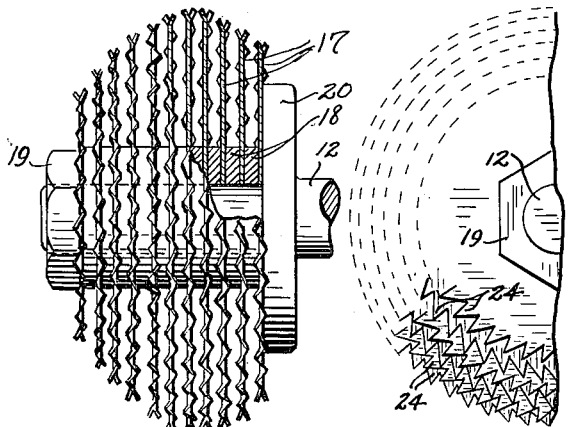
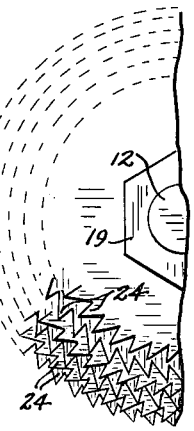
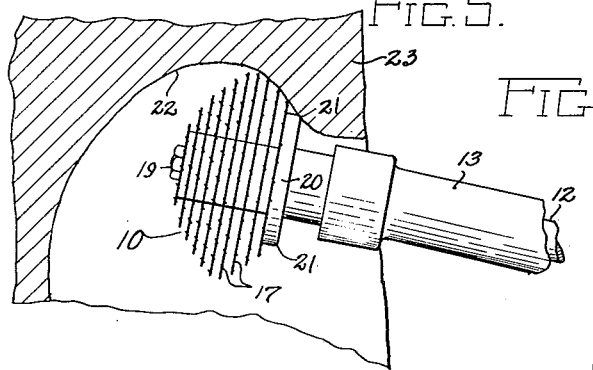
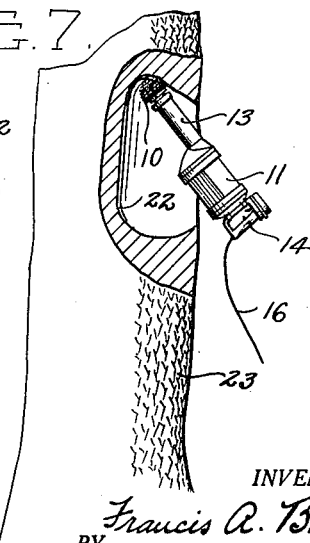
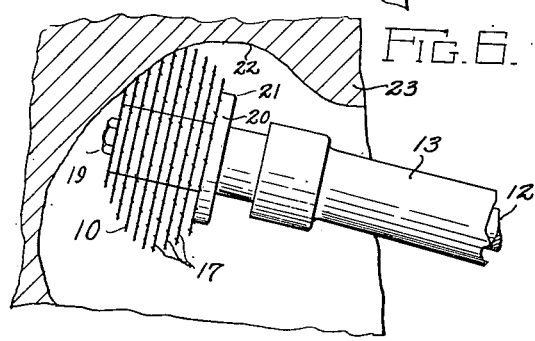
INVENTOR.
Francis A. Bartlett
BY Wooster & Davis
ATTORNEYS.

Patented July 10, 1923.

1,461,376

UNITED STATES PATENT OFFICE.

FRANCIS A. BARTLETT, OF STAMFORD, CONNECTICUT.

CUTTING BUR.

Application filed November 29, 1921. Serial No. 518,546.

*To all whom it may concern:*

Be it known that I, FRANCIS A. BARTLETT, a citizen of the United States, residing at Stamford, county of Fairfield, State of Connecticut, have invented an Improvement in Cutting Burs, of which the following is a specification.

This invention relates to the art of tree surgery and particularly to an improved means for gouging out the decayed wood and preparing the cavity in the tree for the filling of cement or whatever material may be employed for this purpose.

Hitherto, it has been the practice in gouging out the dead wood and cleaning the cavity in the trees to be treated, to do this work by hand with a chisel and mallet, which, as can readily be seen, is a very slow method, increasing the time required for any given job and also the cost.

This invention has for an object, therefore, to provide a cutter for this purpose which may be power driven and which will reduce the time required for preparing the cavity and consequently the cost of treating the tree.

It is a further object of the invention to provide a device which will give a more uniform surface to the cavity than can be obtained by the hand operated chisel and mallet.

It is a still further object of the invention to provide a cutter which will operate at practically any angle, and which may also be adjusted to vary its grip or cutting effect in operating on different kinds of wood or woods of different hardness.

With the foregoing and other objects in view I have devised the device illustrated in the accompanying drawing, in which—

Fig. 1 is a side elevation of my device as preferably constructed.

Fig. 2 is a front elevation of the cutting bur.

Fig. 3 is a side elevation thereof, part of the saws being broken to show the method of securing the same to the shaft.

Fig. 4 is a front elevation of a slightly modified construction, and

Figs. 5, 6 and 7 are views illustrating the use of the device in preparing cavities in the trees to be treated.

Reference is had to Fig. 1 in which is illustrated the preferred construction of a device for gouging out the dead wood and preparing the cavities in trees to be treated in the art of tree surgery. This device comprises a novel cutting bur 10, the specific structure of which will be later described, and means for supporting and rotating the same. This latter means comprises an easily carried casing 11 in which is mounted an electric motor having suitable driving connection with a shaft 12 extending through the cylindrical extension 13, and on the free end of which is mounted the cutting bur 10. The extension 13 provides means for the operator to grip the device with one hand in manipulation thereof, and secured to the other end of the casing is a pistol grip 14 with a suitable trigger 15 operating the switches for controlling the motor, the current being led thereto from any suitable source through the cable 16.

The cutting bur is preferably constructed as shown in Figs. 2 and 3 and comprises a plurality of disc saws 17 on the shaft and spaced from each other any distance desired by suitable spacing collars or washers 18. If desired, these washers may be dispensed with. The saws and washers are securely clamped together by means of a nut 19. I prefer to have the inner saw adjacent a collar or flange 20, the collar being somewhat smaller in diameter than the end saw, but this collar is not absolutely necessary, although desirable for a purpose later to be described. The teeth of the saws may be fine or coarse, as may be found desirable, and are set as indicated in Fig. 3. These saws are of different diameters so as to give a curved contour to the bur, as shown in Fig. 3, and are so arranged that the largest diameter is intermediate the ends of the bur. This forms a structure which allows for operating at various angles and is especially adapted for gouging out and preparing the surface of a cavity.

In use, the operator supports the device by gripping the same at extension 13 and the pistol grip 14, controlling the motor by means of the trigger 15. It will then be seen he may move the cutting bur to various angles and prepare the surfaces, as desired. In Fig. 5 is shown the use of the collar 20 in preparing a surface which is so arranged as not to be clearly visible to the operator. In working on this surface the bur is drawn forwardly or to the right, as shown in Fig. 5, and downwardly, the edge 21 of the collar 20 moving along the surface of the cavity 22 and acting as a guide for the bur, and preventing the operator forcing it too deeply against the wood, thus giving a better finished surface and preventing sticking of the bur.

Fig. 6 illustrates the use of the bur in preparing surfaces deeper within the cavity using the inner curved portion of the bur, the tree being indicated at 23.

In the slight modification shown in Fig. 4, the teeth 24 of the saw, instead of being V-shaped as shown in Fig. 2, have one side thereof radially arranged so that the saw has a greater action when rotating in one direction than the other. By this arrangement of the teeth some of the saws, say every other one as illustrated, may be reversed to reduce the bite of the saw in operation or, if desired, they may all be reversed still further reducing the bite of the saw, depending upon the kind of wood to be operated upon.

It will be evident that the use of a device of this character will be much more rapid than the old hand method of gouging out the cavities. Also that the surfaces of the cavities will be more uniformly treated. As the saws are entirely separate and distinct from each other they may be removed from the shaft for filing and setting and, as they are spaced somewhat from each other, they will not clog in operation. Although I have shown the device as driven by a motor driving a rigid shaft to which the bur is attached, I do not wish to be limited to this arrangement, although it is the preferred one, as the bur may be driven by means of a flexible shaft connected to a suitable motor.

It will be noted that the device is very simple in construction and may be easily assembled and also may be easily disassembled for renewal, sharpening, or repairs. As it works rapidly, the time required for preparing a given cavity is very much reduced over the old hand method.

Having thus set forth the nature of my invention, what I claim is:

1. In the art of tree surgery, means for gouging out a cavity to be filled, comprising a power driven cutting bur completely free and controllable so that it may be operated at various angles and is freely movable in any direction, said cutting bur comprising a plurality of spaced discs having cutting teeth on their peripheries, the discs intermediate the ends of the bur being of larger diameter than those adjacent the ends thereof to give a curved contour to the bur, and a guiding flange at the inner end of the bur of sufficient diameter and thickness to afford with relation to the contour of the bur a guiding bearing upon which the bur may be rocked to govern the penetration of the teeth.

2. In the art of tree surgery, means for gouging out a cavity to be filled, comprising a power driven cutting bur completely free and controllable so that it may operated at various angles and is freely movable in any direction, said cutting bur comprising a plurality of discs having cutting teeth on their peripheries, a shaft upon which the discs are mounted, spacing washers between the discs, the diameters of the discs gradually increasing from one end to a point intermediate the ends of the bur and then gradually decreasing to the other end to give a curved contour to the bur, a guiding flange on the shaft at the inner end of the bur of sufficient diameter and thickness to afford with relation to the contour of the bur a guiding bearing upon which the bur may be rocked to govern the penetration of the teeth, and means for clamping the discs and washers together and against said flange.

3. In the art of tree surgery, means for gouging out a cavity to be filled, comprising a power driven cutting bur completely free and controllable so that it may be operated at various angles and is freely movable in any direction, said cutting bur comprising a plurality of spaced discs having cutting teeth on their peripheries inclined in the plane of the disc, said discs being arranged with the teeth on adjacent discs inclined in opposite directions, and the discs intermediate the ends of the bur being of larger diameter than those adjacent the ends thereof to give a curved contour to the bur.

In testimony whereof I affix my signature.

FRANCIS A. BARTLETT.